Sept. 27, 1966   E. S. BABSON   3,274,953
CONVEYOR CONTROL DEVICES
Filed June 2, 1964   4 Sheets-Sheet 1

Inventor
Edward S. Babson
By his Attorney
Robert E. Ross

Sept. 27, 1966  E. S. BABSON  3,274,953
CONVEYOR CONTROL DEVICES
Filed June 2, 1964 4 Sheets-Sheet 2

Sept. 27, 1966        E. S. BABSON        3,274,953
CONVEYOR CONTROL DEVICES
Filed June 2, 1964        4 Sheets-Sheet 4

United States Patent Office 3,274,953
Patented Sept. 27, 1966

3,274,953
CONVEYOR CONTROL DEVICES
Edward S. Babson, Ipswich, Mass., assignor to United Shoe Machinery Corporation, Boston, Mass., a corporation of New Jersey
Filed June 2, 1964, Ser. No. 372,059
6 Claims. (Cl. 104—172)

This invention relates generally to conveyor systems in which article carrying racks having friction drive means are moved between work stations disposed on both sides of a double run conveyor or tow chain, and has particular reference to such a system in which novel means is provided for transferring a rack from the end of one run to the beginning of the next run.

In a copending application Serial No. 371,204, filed May 29, 1964, by the present inventor, there is disclosed a work handling system of the above described type in which individual racks are provided with a friction loaded sprocket for engagement with the tow chain, said sprocket being adapted to remain in engagement with the chain during the entire time the rack is disposed in operative relation to the chain.

Installations of the type of conveyor and rack disclosed in the above identified application usually comprises two parallel runs which travel in opposite directions, and are spaced apart far enough to permit the installation of various rack control mechanisms between the runs. During operation, racks travel in one direction between work stations disposed on one side of the conveyor chain and travel in the opposite direction between work stations on the opposite side of the conveyor chain.

When a rack arrives at the end of the first run, to avoid the necessity of manually removing the rack from the the end of the first run and pushing it around the end of the conveyor into engagement with the second run, it is desirable to have suitable mechanism for accomplishing such transfer, and means for controlling the entrance of the racks into the transfer mechanism.

The object of this invention is to provide a conveyor system of the type described in which means is provided for transferring a rack around the end of the conveyor without disconnecting the drive means from the chain.

A further object of the invention is to provide transfer means for a conveyor system of the type described which is capable of transferring racks from the end of one run of the conveyor to the beginning of another at a speed substantially slower than the speed of the conveyor chain.

A further object of the invention is to provide a transfer means for the purpose described in which no additional drive mechanism is required for accomplishing the transfer.

A further object of the invention is to provide an improved form of control means for regulating the entrance of racks into the transfer means.

Other objects of the invention will be apparent to one skilled in the art from the following description of a specific embodiment thereof.

Figure 1:
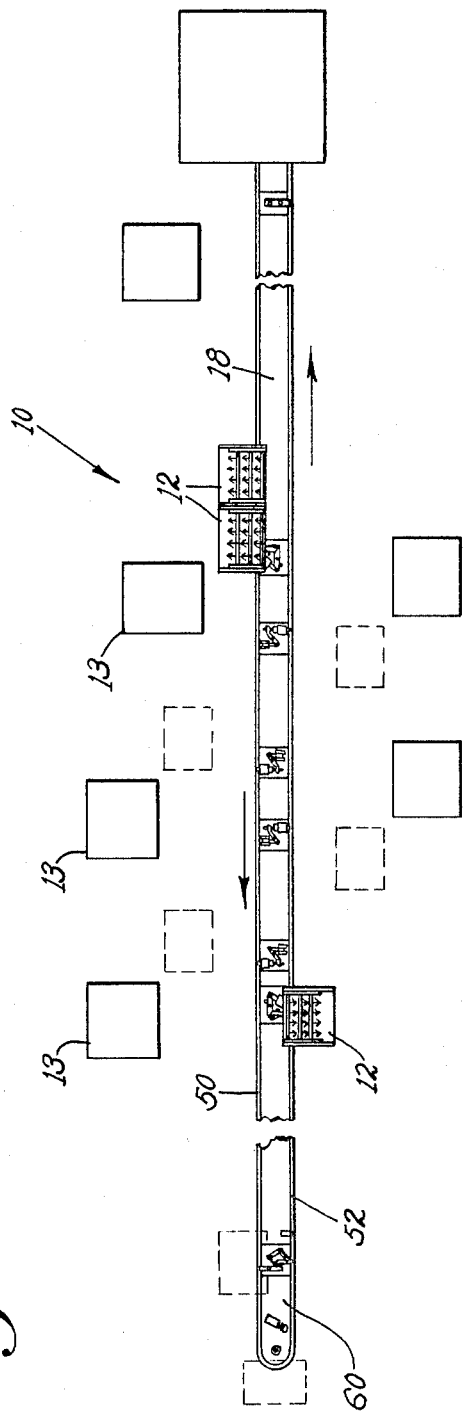
FIG. 1 is a schematic plan view of a conveyor system embodying the features of the invention.

Referring to the drawings there is illustrated a drag line conveyor system which comprises a floor mounted conveyor 10 which is adapted to convey article carrying devices such as racks 12 between various work stations 13. In the illustrated embodiment the conveyor 10 comprises an endless tow chain 14 which travels in a pair of spaced guide channels 16 disposed on opposite sides of a center housing 18. During normal operation of the system the chain is driven continuously in one direction which, in the illustrated embodiment is in the direction of the arrows in FIGS. 1 and 2. The chain is of the type commonly known as a roller chain and comprises a series of spaced vertical members 20 retained in position by upper and lower spacing plates 22. To provide means for retaining the rack in operative relation to the conveyor chain a cover 24 is disposed over each run of the chain, the outer edge of each of said covers having a downwardly sloping cam surface 26 leading to a shoulder portion 28 for a purpose to appear hereinafter.

The racks 12 each comprise a base 30 suitably mounted on casters (not shown) to enable the rack to be moved freely in any direction. To provide means for engagement with the conveyor chain, a drive sprocket 38 is mounted below the rack base on a suitable shaft 40. In the illustrated embodiment the drive sprocket is disposed between a pair of friction disks 42, said disks being non-rotatably disposed on the shaft 40 and being urged against the drive sprocket by means of a spring 44 which is maintained under compression by an adjusting nut 46.

To provide means for releasably maintaining the rack in the proper position in relation to the chain 14 so that the sprocket 38 is engaged with the chain, a spring loaded ball detent 48 is mounted on the side of the rack adjacent the chain. The detent is positioned at an elevation such that when the rack is moved into operative relation to the conveyor by being pushed sideways toward the tow chain, the detent 48 cams itself up the surface 26 and snaps over the shoulder portion 28 of the chain cover 24.

During normal operation of the conveyor a rack to be transported thereby may be pushed against the conveyor in the manner described so that the sprocket 38 engages the continuously moving chain. Since the rack at this instant is stationary the drive sprocket will rotate momentarily at a rate corresponding to the chain speed, and as the force applied thereto by the chain accelerates the rack in the direction of chain motion, the rate of rotation of the sprocket will decrease substantially to zero. When the rack being conveyed reaches a stop mechanism, or collides with a previous rack or some other obstruction, causing the rack to stop, the drive sprocket, which remains in engagement with the chain, commences to rotate at a speed corresponding to the chain speed. When the stop mechanism is released or the obstruction is removed the rack will again accelerate to the speed of the chain, with the sprocket rotation decreasing substantially to zero as the rack accelerates.

To control the movement of racks along the conveyor, stop members of various types may be disposed on the center housing 18. A stop member suitable for this purpose is disclosed in my copending application Serial No. 371,194, filed May 29, 1964.

In the illustrated embodiment, work stations 13 are positioned along both sides of the conveyor runs. To provide means for automatically moving a rack around the end of the conveyor from the end of the outgoing run 50 to the beginning of the incoming run 52 transfer means 54 and control mechanism 56 are provided at the end of the conveyor opposite the driving means.

Disposed at said end of the conveyor is an idler pulley 58 around which the chain 14 extends. Disposed over the pulley 58 and extending a substantial distance toward the opposite end of the conveyor is a cover plate 60. A retaining rim 62 projects upwardly from the outer edge of the cover, said rim, along the side edges of the cover, conforming generally to the position of the shoulder 28 on the chain cover 24 and being the same relative distance laterally from the chain around the periphery of the pulley 54.

A rack is carried around the end of the conveyor in the following manner. As a rack approaches the transfer device, the ball detent passes from the chain cover 24 onto the cover plate 60 behind the retaining rim 62. The rim 62 is sufficiently high that it retains the ball detent against outward lateral movement and hence when the detent reaches the curved portion of the rim it forces the rack to travel around the end of the conveyor from the outgoing rim 50 to the incoming run 52.

During this portion of the rack movement, if the rack were to continue at the same speed as the drive chain, the increased drag of the ball detent and the additional force required to change the direction of the rack and casters would cause an undesirable additional load on the drive chain and motor, and would tend to dislodge articles from the rack.

However, since the rack is being driven by the friction loaded sprocket, the increased drag simply results in rotation of the sprocket and resultant slowing of the speed of the rack with no appreciable increase in chain load.

To avoid possible collision between racks during such transfer, when adjacent racks might be so angularly disposed that contact therebetween might damage the articles carried on the racks, means must be provided for preventing the entrance of a second rack into the transfer mechanism if a first rack is already in the mechanism, and means must be provided responsive to the discharge of the first rack to admit the second rack.

Referring to FIGS. 2–6, the rack control mechanism 56 for the above-described purposes comprises a stop arm 64 positioned to stop a rack approaching the transfer mechanism, a latch arm 66 positioned to be actuated by a rack leaving the transfer mechanism in a manner now to be described, and a latch operating arm 68.

The mechanism 56 operates to control the entrance of racks into the transfer mechanism in the following manner.

Figure 2:
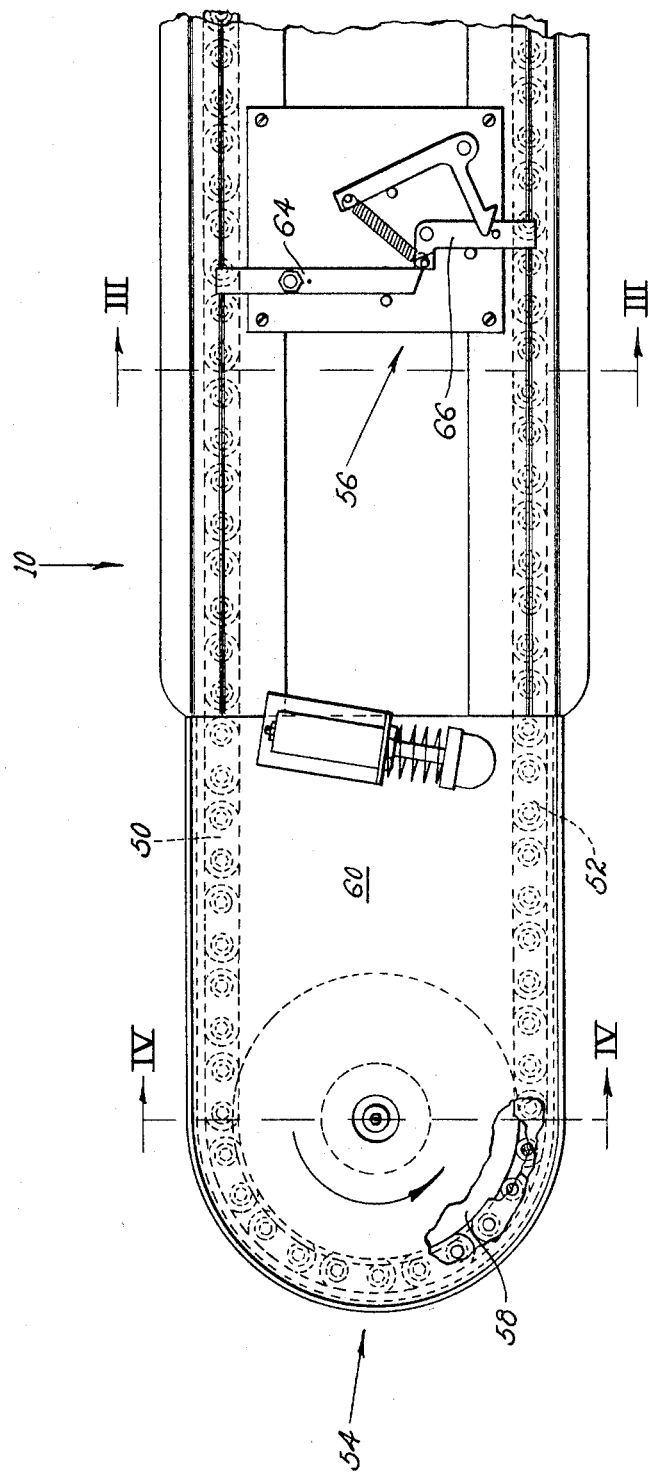
FIG. 2 is a top plan view of one end of a conveyor system illustrating the transfer means for moving the rack around the end of the conveyor and the means for controlling the entrance of racks into said transfer means.
Figure 3:
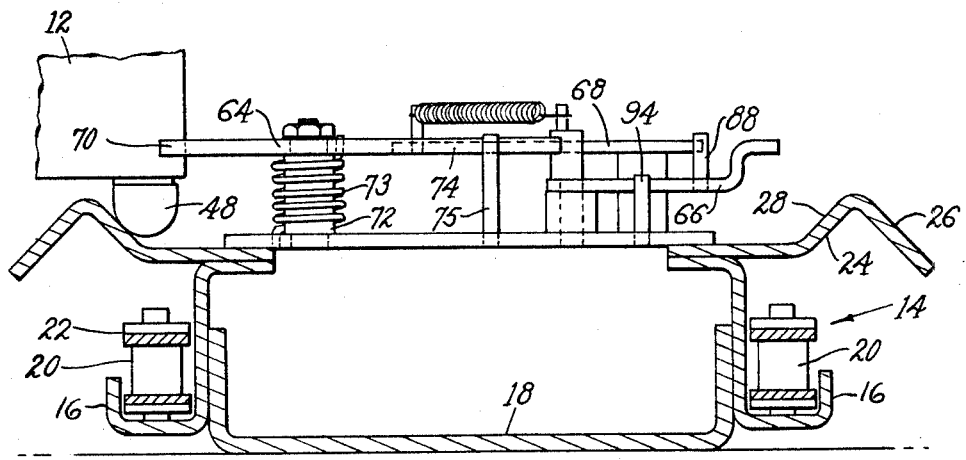
FIG. 3 is a view in section taken on line III—III of FIG. 2.
Figure 4:
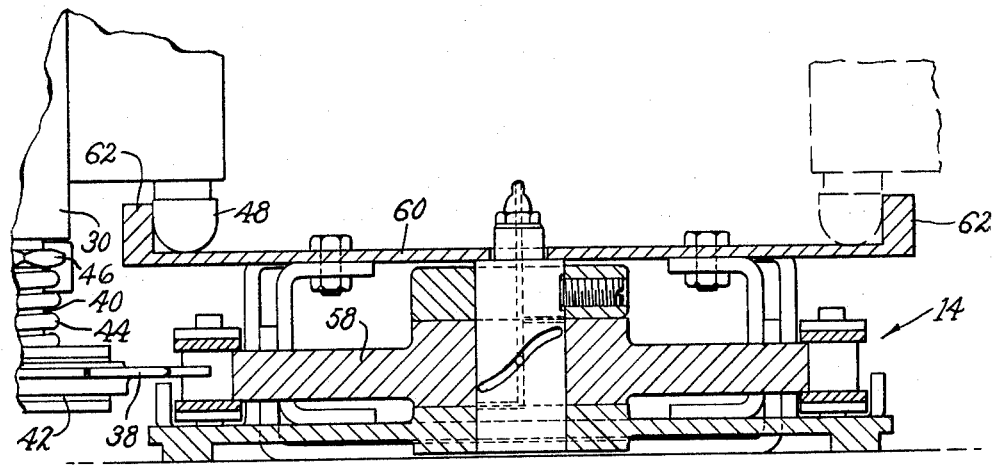
FIG. 4 is a view in section taken on line IV—IV of FIG. 2.
Figure 5:
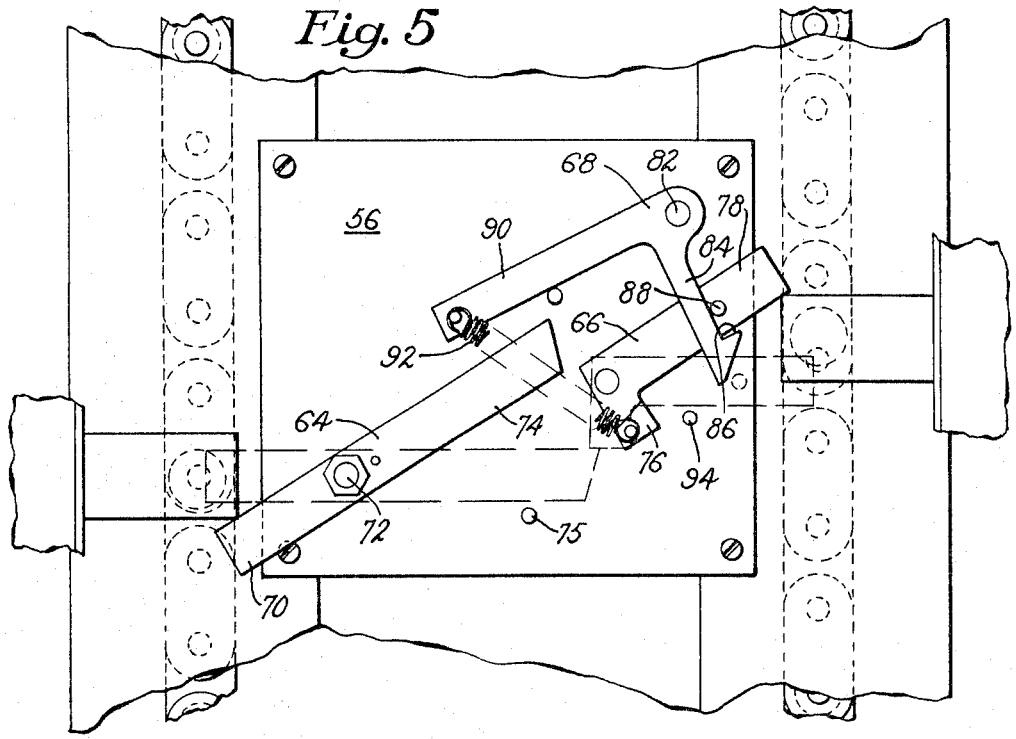
FIG. 5 is a top plan view of the mechanism for controlling the entrance of racks into the transfer mechanism illustrating the unlocking of the entrance control stop arm by a rack leaving the transfer mechanism.
Figure 6:
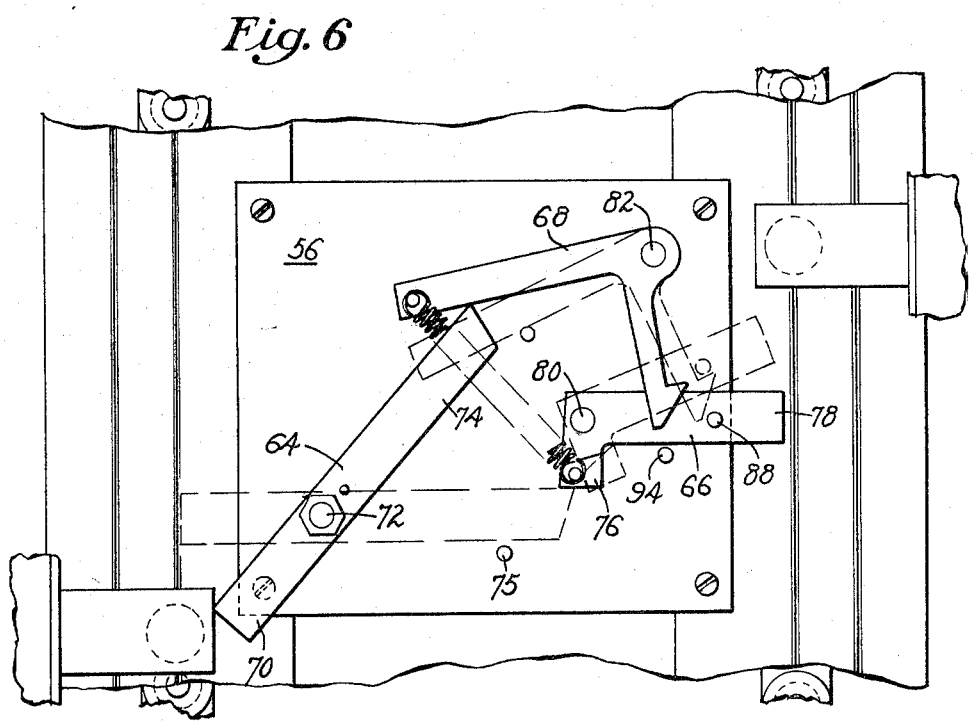
FIG. 6 is a view similar to FIG. 5 showing the entrance control stop arm being reset to the stop position by the rack passing the entrance control stop arm.

Assuming that there is a rack in the transfer mechanism, the positions of the stop arm 64 and the latch arm 66 are shown in FIG. 2 and in phantom lines in FIG. 5. The arm 64 is pivoted at 72 and is biased by a torsion spring 73 so that an end 74 of the arm rests against a pin 75, and the end 70 of the arm 64 projects over the chain cover 24 into the path of the housing of the ball detent 48 (see FIG. 3) of a rack approaching the transfer mechanism, so that said rack is arrested by engagement with said end 70 of the arm 64.

The arm 64 is latched in the stop position by engagement of the end portion 74 with the adjacent end 76 of the latch arm 66, and is unlatched to admit the next rack when a rack in the transfer means is discharged therefrom and passes the end 78 of the latch arm 66 whereby said arm is pivoted in a counterclockwise direction (see FIG. 5) about a pivot 80 to the position shown in full lines in FIG. 5. The end 76 is thereby moved out of engagement with the end 74 of the stop arm 64. The rack which has been retained by the stop arm is thereby released to enter the transfer mechanism. As the rack moves forwardly it swings the arm 64 in a counterclockwise direction to actuate the mechanism in a manner to be described.

In some instances, when a rack leaves the transfer mechanism, there will not be a rack waiting at the stop arm 64. Hence, means must be provided for insuring that the stop arm 64 thereafter remains free, so that a rack arriving subsequently can pass directly into the transfer device without stopping.

For this purpose the latch operating arm 68, pivoted about 82 is provided with a catch portion 86 positioned to engage a pin 88 on the end of the latch arm 66 when said arm is pivoted by the passage of a rack out of the transfer mechanism. The opposite end 90 of the arm 68 is attached to the latch arm 66 by a spring 92, so that the catch 86 and pin 88 are thereafter retained in engagement by the biasing force of the spring 92 until released in a manner now to be described.

Since a departing rack leaves the stop arm unlatched, means must be provided to latch the stop arm when a rack has entered the transfer mechanism. For this purpose the end 90 of the latch operating arm 68 and the end 74 of the stop arm 64 are disposed in such relation to each other that when the stop arm 64 pivots counterclockwise as a rack (which may be either a rack which has been waiting at the stop arm or a rack which has arrived while the stop arm is unlatched) passes the end 70, the opposite end 74 engages the end portion 90 of the latch operating arm 68 causing the latch operating arm to pivot clockwise thereby releasing the catch 86 from the pin 88. The spring 92 then returns the latch arm 66 to the original position, with the arm 78 resting against stop pin 94.

After the rack has passed the end 70 of the stop arm 64, said arm is returned to the stop position by spring 73, so that the end 74 again latches behind the end 76 of arm 66 (which requires that the arm 66 pivot a small amount counterclockwise to allow the end 74 to pass behind end 76 of arm 66) so that the stop arm 64 is again locked until the rack has left the transfer means.

Since certain obvious changes may be made in the device without departing from the scope of the invention, it is intended that the description of the above illustrated embodiment of the invention be interpreted in an illustrative and not a limiting sense.

Having thus described my invention, what I claim as new and desire to secure by Letters Patent of the United States is:

1. A conveyor system comprising a tow chain extending around a direction changing wheel to form separate conveyor runs, a guide plate disposed over said chain shaped to provide a guide ridge and a camming surface in both sides of the guide ridge whereby an article carrying device having chain engaging means and spring biased detent means may be engaged and disengaged with the tow chain by lateral movement toward and away from the chain, said guide plate extending over each run and terminating in spaced relation to the wheel, and a guide cover disposed over the wheel, said cover having a retaining rim disposed about a portion of the periphery of the wheel and having ends extending into alignment with the ends of the guide plate, said retaining rim being shaped to prevent lateral movement of the detent means in relation to the rim and being positioned in relation to the wheel to retain the chain engaging means in engagement with the chain.

2. A transfer mechanism for use with a conveyor system of the type in which a tow chain is adapted to receive a drive member of an article carrying device to be conveyed thereby and guide means is associated with the chain to releasably engage a guide member on the article carrying device to maintain said drive member in engagement with the chain, said transfer mechanism comprising a direction changing wheel around which the chain travels, a guide member retaining rim disposed around a peripheral portion of the wheel, said guide member retaining rim at the ends being aligned with said guide means, said rim being shaped to prevent disengagement of the guide member by lateral force applied thereto and being positioned to maintain the drive member in engagement with the chain as it moves about said peripheral portion of the wheel.

3. A transfer mechanism for use with a conveyor system of the type in which a tow chain is adapted to receive a friction drive wheel of an article carrying device to be conveyed thereby and the article carrying device is provided with guide means adapted for releasable engagement with a guide rail associated with the chain, said transfer mechanism comprising a direction changing wheel around which the chain travels, a guide rim disposed around a portion of the periphery of the wheel, said guide rim at the ends being aligned with the ends of the guide rail and being spaced laterally from the chain about said peripheral portion of the wheel a distance substantially equal to the spacing of the guide rail from the chain, said rim being shaped to prevent disengagement of the guide means therefrom by radial forces applied to the article carrying device.

4. In a conveyor system for transferring racks between work stations, comprising a first run for conveying racks in one direction, a second run for conveying racks in another direction, transfer means adapted to transfer racks from the first run to the second run, and control means for preventing the entry of a rack into the transfer means until a rack in the transfer means has been discharged therefrom, said control means comprising a first pivotal arm projecting into the path of a rack approaching the transfer means and a second pivotal arm projecting into the path of a rack leaving the transfer means, said second arm having a portion adapted to latch the first arm in a stop position to prevent entry of a rack into the transfer means and being pivotal by a rack leaving the transfer means to unlatch the first arm to permit it to pivot from the stop position to admit a rack into the transfer means, and a control member adapted to latch the second arm in the unlatching position when pivoted by a departing rack and adapted to be actuated to unlatch the second arm by the pivoting of the first arm by an entering rack.

5. In a conveyor system for transferring article carrying devices between work stations, comprising a first run for conveying articles in one direction, a second run for conveying articles in another direction, transfer means adapted to transfer articles from the first run to the second run, and control means for controlling the entry of articles into the transfer means, said control means comprising a stop arm normally biased to a stop position to arrest article carrying devices approaching the transfer means and being pivotal to release an article carrying device into the transfer means, a first latch member adapted to latch the stop arm in the stop position, means responsive to the discharge of an article carrying device from the transfer means to move said first latch means to a non-latching position, a second latch member adapted to thereupon latch said first latch member in the non-latching position, and means responsive to the pivoting of the stop arm by an article carrying device released to enter the transfer means by the unlocking of the stop arm to actuate said second latch means to release the first latch means to permit it to return to the latching position.

6. In a conveyor system for transferring article carrying devices between work stations comprising a first run for conveying articles in one direction, a second run for conveying articles in another direction, and transfer means adapted to transfer articles from the first run to the second run, control means comprising a stop member for controlling the entry of article carrying devices from the first run into the transfer means, said stop member having a stop condition and a pass condition, a stop member locking arm movable between a locking position in which the stop member is locked in the stop condition and a non-locking position in which the stop member is movable to permit an article carrying device to enter the transfer means, means responsive to the discharge of an article carrying device from the transfer means to move the stop member locking arm to the non-locking position, latch means responsive to the movement of the locking arm to the non-locking position to latch said arm in the non-locking position, and means responsive to the passage of a rack past the unlocked stop member to release said latch means to permit the stop member locking arm to return to the locking position.

No references cited.

ARTHUR L. LA POINT, *Primary Examiner.*

F. W. MONAGHAN, D. HOFFMAN,
        *Assistant Examiners.*